United States Patent [19]

Imamura et al.

[11] Patent Number: 4,855,866
[45] Date of Patent: Aug. 8, 1989

[54] CAPACITOR NETWORK

[75] Inventors: Eiji Imamura; Katsumi Nishiyama, both of Nagaokakyo, Japan

[73] Assignee: Murata Manufacturing Co., Ltd., Nagaokakyo, Japan

[21] Appl. No.: 203,152

[22] Filed: Jun. 6, 1988

[30] Foreign Application Priority Data

Jun. 6, 1987 [JP] Japan .................................. 62-87764
Sep. 29, 1987 [JP] Japan ................................ 62-150015

[51] Int. Cl.4 ........................... H01G 1/00; H05K 1/06
[52] U.S. Cl. ...................................... 361/306; 361/402
[58] Field of Search ............ 361/433 C, 433 S, 321 R, 361/306 F, 321 F, 306 DC, 402, 403, 404, 411, 302

[56] References Cited

U.S. PATENT DOCUMENTS

| | | | |
|---|---|---|---|
| 2,877,389 | 3/1959 | Wiener | 361/402 |
| 3,256,499 | 6/1966 | Khouri et al. | 361/402 X |
| 3,689,684 | 9/1972 | Cox et al. | 361/402 X |
| 3,745,430 | 7/1973 | Lunquist et al. | 361/302 X |
| 3,939,558 | 2/1976 | Riley | 361/402 X |
| 4,090,231 | 5/1978 | Millard et al. | 361/433 C |
| 4,225,900 | 9/1980 | Ciccio et al. | 361/403 X |
| 4,293,890 | 10/1981 | Varsane | 361/321 R X |
| 4,701,830 | 10/1987 | Kato et al. | 361/404 X |

Primary Examiner—Donald A. Griffin
Attorney, Agent, or Firm—Wenderoth, Lind & Ponack

[57] ABSTRACT

A capacitor network is provided for noise elimination on the input/output terminals of an electric computer or the like. A plurality of data electrodes are disposed on one surface of a dielectric substrate, and a common electrode is disposed opposite to the data electrodes on the other surface of the dielectric substrate. A pair of lead terminals are connected to each data electrode at both ends of the electrode, and at least one ground terminal is mounted to the common electrode, thereby forming a plurality of three-terminal capacitors in network.

10 Claims, 3 Drawing Sheets

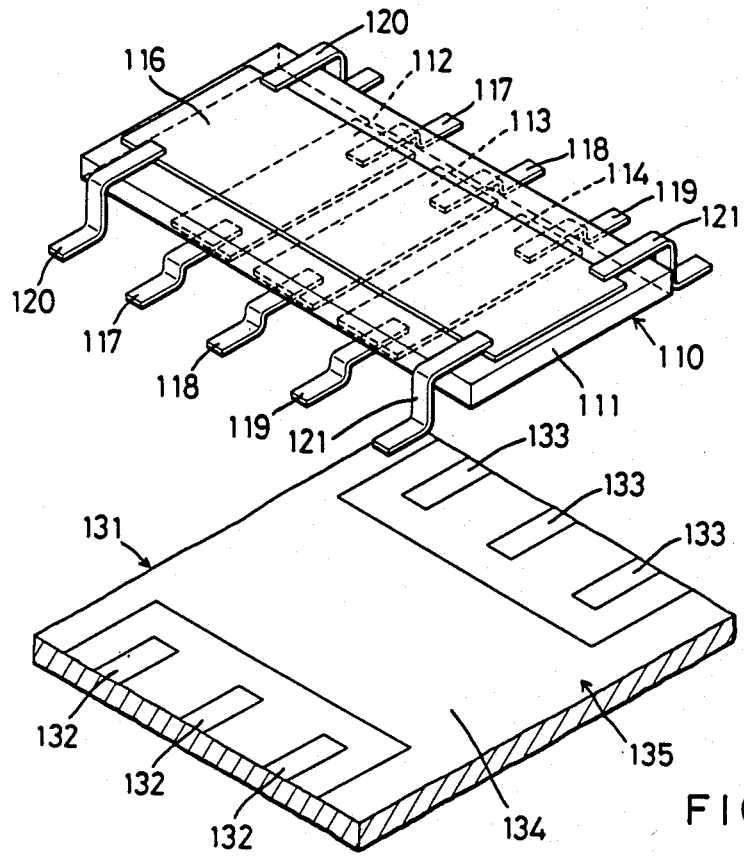
FIG.10
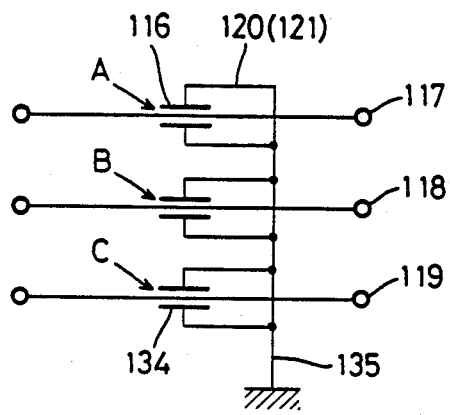
FIG.11
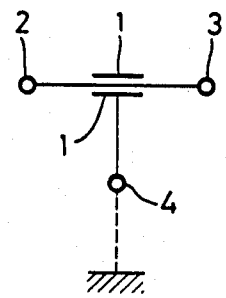
PRIOR ART
FIG.12
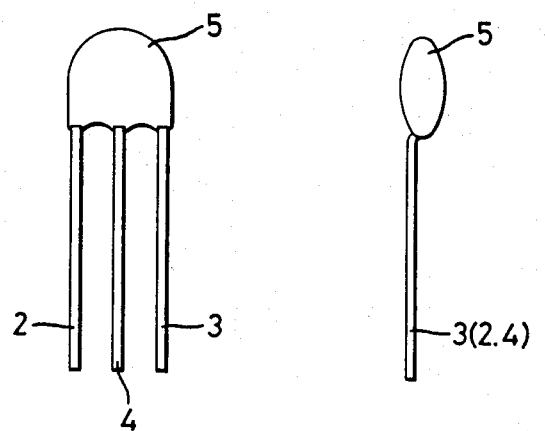
PRIOR ART
FIG.13
PRIOR ART
FIG.14

CAPACITOR NETWORK

BACKGROUND OF THE INVENTION

The present invention relates to a capacitor network mounted for noise elimination on input/output terminals of a computer or the like.

The conventional three-terminal capacitor, as shown in an equivalent circuit diagram in FIG. 12, is so constructed that input-output lead terminals 2 and 3 are connected to one of two electrodes 1 provided opposite to each other on both surfaces of a dielectric, and a lead terminal 4 is connected to the other electrode 1. The input-output terminals 2 and 3 are connected in series with the circuit, the terminal 4 being ground. Accordingly, while a signal is being input to the terminal 2 and output from the terminal 3, noises included in the signal are removed from the terminal 4 to ground.

Thus, a three-terminal capacitor, which is remarkably effective in noise elimination, is often used for the input-/output terminals of a computer or the like.

The conventional three-terminal capacitor, as shown in FIGS. 13 and 14, comprises a capacitor body 5 molded with resin, input-output terminals 2 and 3, and ground terminal 4, as individual parts. Therefore, when the three-terminal capacitor is mounted on a circuit substrate, a large mounting space is required, so that the three-terminal capacitor is too large in mounting area among the circuit substrate and an input/output connector, which are highly densified, thereby creating the problem in that the three-terminal capacitor can not be mounted close to the input-output connector. Moreover, three-terminal capacitors of the same type must be mounted at every circuit, thereby creating the problem in that the mounting work is complicated and the efficiency is inferior.

OBJECT OF THE INVENTION

A first object of the present invention is to provide a capacitor network which can be networked and mounted close to a highly densified input-output connector.

A second object of the present invention is to provide a capacitor network which finishes mounting work in one step to improve productivity.

A third object of the present invention is to provide a capacitor network which mechanically holds a dielectric substrate by a plurality of terminals so as to be strong in construction.

A fourth object of the present invention is to provide a capacitor network easy to manufacture and assemble and inexpensive to network.

A fifth object of the present invention is to provide a capacitor network having a larger noise elimination effect and obtainable of superior elimination effect especially of high frequency noise.

These and other objects of the invention will be seen by reference to the description, taken in conjunction with the accompanying drawings.

BRIEF DESCRIPTION OF THE DRAWINGS

FIG. 10 is a perspective exploded view of a second embodiment of the capacitor network of the invention, FIG. 11 is an equivalent circuit diagram of the second embodiment of FIG. 10, FIG. 12 is a circuit diagram of the conventional three-terminal capacitor, and FIGS. 13 and 14 are front and right-side views showing the outline of the conventional three-terminal capacitor.

DETAILED DESCRIPTION OF THE PREFERRED EMBODIMENTS

Figures 1, 2, 3:
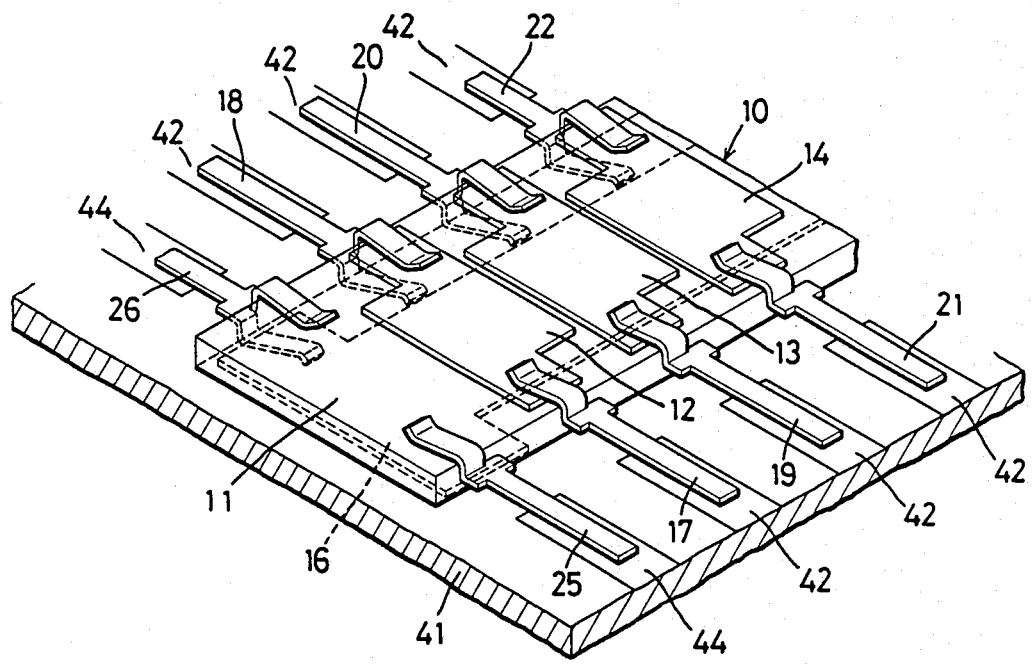
FIG. 1 is a perspective view of a first embodiment of a capacitor network of the invention.
FIG. 2 is a front view of a plurality of data electrodes on a dielectric substrate of FIG. 1.
FIG. 3 is a rear view of a common electrode on the dielectric substrate of FIG. 2.

FIG. 1 shows a first embodiment of a capacitor networ 10 of the invention, networked into a flat package, and entirely molded with resin (not shown), except for open ends of the terminals. In FIGS. 1 and 2, reference numeral 11 designates a dielectric substrate of ceramics. A plurality of data electrodes 12, 13, 14 and 15 are disposed on the surface of the dielectric substrate 11 and a common electrode 16 is disposed on the other surface and opposite to the data electrodes 12, 13, 14 and 15, electrostatic capacity being formed at the opposing electrode portions.

The data electrodes 12, 13, 14 and 15 and common electrode 16 are composed of electrically good conductors, and are provided on the dielectric substrate 11 by sticking metallic foil, vapor-depositing metal, non-electroplating metal or printing and baking metal paste.

The data electrodes 12, 13, 14 and 15 are connected with pairs of clipping type lead terminals 17 and 18, 19 and 20, and 21 and 22 (where the terminals for the electrode 15 are not shown) at both sides of each electrode opposing portion, the common electrode 16 connecting with a pair of clipping type ground terminals 25 and 26.

Also, the data electrodes 12, 13, 14 and 15, as shown in FIG. 2, each comprises an opposing portion 27 opposite to the common electrode 16 to form electrostatic capacity and a pair of connecting portions 28 and 29 connecting with the terminals to form the input-output portions for signals, the data electrodes 12, 13, 14 and 15 being disposed at one surface of the dielectric substrate 11 and spaced at almost equal intervals.

The common electrode 16, as shown in FIG. 3, comprises an opposing portion 30 opposite to all the data electrodes 12, 13, 14 and 15, and connecting portions 31 connecting with the pairs of terminals 25 and 26.

Figure 4:
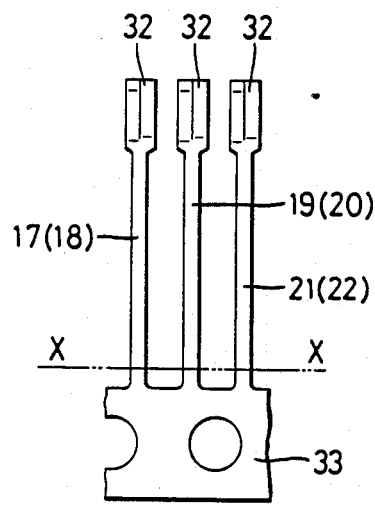
FIG. 4 is a front view showing the configuration of the terminals of FIG. 1, prior to mounting on the substrate.

The terminals 17 through 26, as shown in FIG. 4, are each slit at one utmost end 32, and the slit ends are bent reversely to each other so that the dielectric substrate 11 and connecting portions 28, 29, and 31 at the electrodes are clipped by a spring force of the split ends.

On the other hand, the other ends of the terminals are connected with a base 33. After the terminals 17 through 26 are brought into press-contact with the electrodes by the spring force of the utmost ends 32, the utmost ends 32 and connecting portions 28, 29 and 31 are connected by soldering. Thereafter, the base 33 is cut at the two-dot-chain lines X as shown in FIG. 4 and separated from the terminals.

Figure 5:
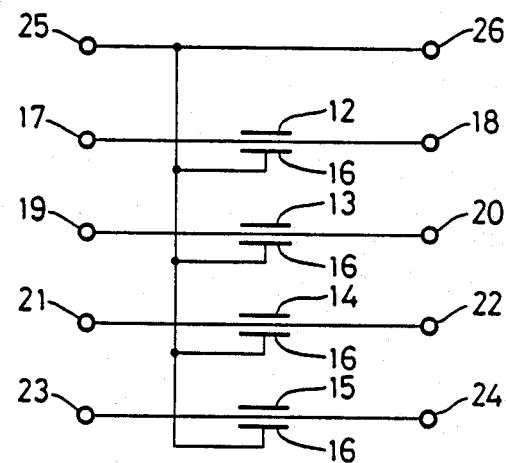
FIG. 5 is an equivalent circuit diagram of the capacitor network shown in FIG. 1.

In the circuit of the embodiment of the invention constituted as above, as shown in FIG. 5, the data electrodes 12, 13, 14 and 15 and common electrode 16 form electrostatis capacity, and the capacitor network connected at the terminals through the common electrode 16 is constituted.

The capacitor network as shown in FIG. 1 is mounted on a circuit substrate 41 and the pairs of terminals 17 and 18, 19 and 20, 21 and 22, and 23 and 24 (not shown) are connected in series with a data circuit 42 formed on one surface of the circuit substrate 41, and the terminals 25 and 26 are connected with ground via dummies 44, so that, for example, the terminals 17 and 18, electrodes 12 and 16, and terminals 25 and 26 function as one three-terminal capacitor.

In other words, when a signal is input to the terminal 17 and output from the terminal 18 through the electrode 12, the electrostatic capacity formed by the electrode 12 and common electrode 16 absorbs noise included in the signal, thereby sending the noise from the terminals 25 and 26 to ground 44 through the common electrode 16.

Thus, in the first embodiment, the common electrode is used in common to the respective three-terminal capacitors, thereby restricting mounting intervals between the terminals to enable high density mouting. Moreover, the surface mounting of such as a miniflat package is easy to achieve.

The capacitor network of the invention is not confined to the aforesaid embodiment, but is variable with respect to the scope of the key point of the invention.

Figure 6:
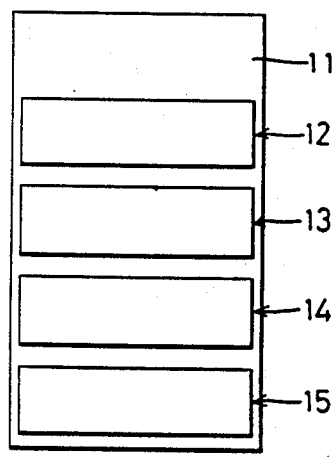
FIG. 6 is a front view of another example of data electrodes on the dielectric substrate of FIG. 1.

For example, the data electrodes 12, 13, 14 and 15, as shown in FIG. 6, may be of the same configuration at the opposing portion and connection portions. In this case, the terminals, when connected, are positioned with ease.

Figure 7:
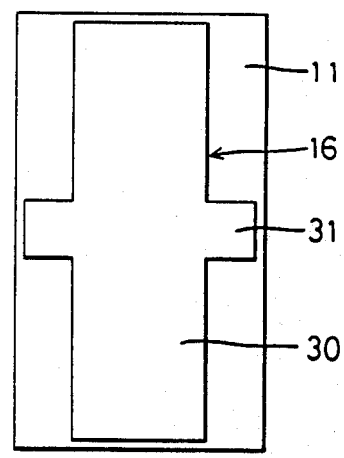
FIG. 7 is a rear view of another example of a common electrode on the dielectric substrate of FIG. 1.
Figure 8:
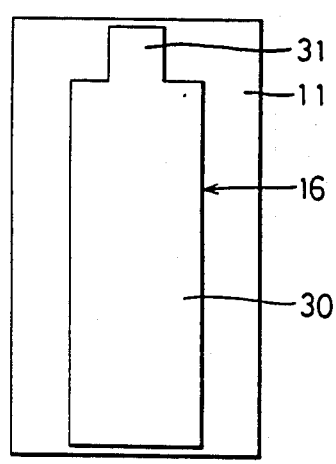
FIG. 8 is a rear view of still another modified embodiment of a common electrode on the dielectric substrate of FIG. 1.

Also, the connecting portions of the common electrode 16, as shown in FIG. 7, may be provided at a substantially intermediate position of the dielectric substrate 11. Furthermore, when connection with the dummy is not required, the connecting portions may be simple, as shown in FIG. 8. Also, the common electrode is not required to be single, but may be plural, corresponding to the characteristic of the signal.

The terminals 17 through 26 are not confined in use to a flat package, but may be changed in configuration so as to be easy to mount.

Figure 9:
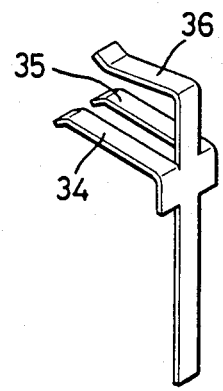
FIG. 9 is a perspective view of another example of a terminal.

Alternatively, the terminal, as shown in FIG. 9, may be slit at its utmost end into three. Slit portions 34 and 35, at the outside of the terminal may be bent, at a right angle, and the center slit portion 36 may rise to the extent of the thickness of the dielectric substrate and electrode, and then may be bent at a somewhat acute angle, thereby forming a slipping type terminal. When such a terminal is used to constitute the capacitor network, the capacitor network is of a dual-in-line package type, thereby restricting the mounting area. Alternatively, a terminal of a wire type may be used.

Furthermore, the capacitor network may at need be covered with epoxy resin or the like, thereby being insulated. insulating process.

As seen from the above, the first embodiment of the capacitor network of the invention can form a plurality of three-terminal capacitors in network, to thereby be mounted close to input-output connectors of high density. Furthermore, the mounting work is completed by one process only, resulting in an improvement in productivity. Moreover, the dielectric substrate is mechanically held by the plurality of terminals so as to be strong in structure, and the parts, such as terminals, are easy to manufacture and assemble, thereby enabling the three-terminal capacitor network to be inexpensively provided.

Referring to FIGS. 10 and 11, a second embodiment of the capacitor network of the invention is shown, which further increases the effect of eliminating noise, and obtains an especially good effect for eliminating high frequency noises.

In FIG. 10, reference numeral 111 designates a dielectric substrate of ceramics. Three data electrodes 112, 113 and 114 are disposed on one surface of the dielectric substrate 111 and are spaced at about equal intervals. A common electrode 116 is disposed at the other surface of the substrate 111 opposite to the data electrodes 112, 113 and 114, so that electrostatic capacity is formed at the opposing electrode portions.

Pairs of pressure welding type lead terminals 117, 118 and 119 are connected by soldering to both ends of the data electrodes 112, 113 and 114, and a pair of pressure welding type terminals 120 and 121 are connected by soldering to both ends of the common electrode 116. Accordingly, for example, the signal input to one lead terminal 117 is output from the other lead terminal 117 through the data electrode 112, at which time when the signal passes through the data electrode 112, noises included in the signal are absorbed to the common electrode 116 disposed opposite the data electrode and introduced to ground terminals 120 and 121, thereby eliminating noises from the signal.

The dielectric substrate 111, data electrodes 112, 113 and 114 and common electrode 116, after the lead terminals 117, 118 and 119 and ground terminals 120 and 121 are connected to the above members, are applied with an insulating material (not shown). The insulating material is formed by molding epoxy resin or applying insulating paint. At the capacitor network 110 formed as above, the lead terminals 117, 118 and 119 and ground terminals 120 and 121 are bent toward the surface on which the data electrodes of dielectric substrate are formed, so that the data electrodes 112, 113 and 114 are disposed at the substrate side with respect to the dielectric substrate 111 when mounted thereto, thereby forming the capacitors in a flat package type.

On a circuit substrate 131 on which the capacitor network 110 is mounted are formed, by screen process printing, data circuits 132 and 133 for a data line on which an input-output signal flows, and a ground conductor 135 having a ground electrode 134. The ground electrode 134 is substantially the same in configuration as the common electrode 116 at the capacitor network 110, and is positioned to cross the circuit substrate 131 with the data circuits 132 and 133, the ground conductor 135 being ground.

Accordingly, when the lead terminals 117, 118 and 119 at the capacitor network 110 are connected to the data circuits 132 and 133 on the circuit substrate 131, and the earth terminals 120 and 121 are connected to the earth conductor 135 respectively, the data electrodes 112, 113 and 114 are sandwiched between the common electrode 116 and the ground electrode 134.

The equivalent circuit of the above constitution, as shown in FIG. 11, is represented by a parallel circuit of three-terminal capacitors A, B and C, wherein the three-terminal capacitors A, B and C are so constructed that the common electrode 116 and ground electrode 134 are earthed, and the data electrodes 112, 113 and 114 through which the signal passes extend between the common electrode 116 and the earth electrode 134. In other words, the capacitors are equivalent in construction to a quasifeedthrough capacitor. When a signal is input to the data electrodes 112, 113 and 114 at the three-terminal capacitors A, B and C constructed as above, noises included in the signal are absorbed by both the common electrodes 116 and ground electrode 134 and eliminated from the signal.

The three-terminal capacitors A, B and C constructed as above each have an especially good eliminating operation for high frequency noise.

Thus, the second embodiment demonstrates not only the essential function as the three-terminal capacitor, but also the function as a feedthrough capacitor, and has the effect of eliminating noises from the signal, especially high frequency noises.

The second embodiment of the invention has been detailed, and the present invention may be variable in the scope of the key point.

For example, an insulating material applied to the outer peripheries of dielectric substrate 111, data electrodes 112, 113 and 114, and common electrode 116 at the capacitor network 110, may be formed of a material such as polystyrene or polyethylene.

The arrangement and number of data electrodes at the capacitor network 110 and the arrangement and number of data circuits 132 and 133 and earth conductor 135 at the circuit substrate 131, may of course be properly changeable as needed. Furthermore, the second embodiment of the capacitor network is preferably of the flat package type, but applicable to the dual inline package type.

Furthermore, the ground electrode formed at the circuit substrate is not inevitably the same in configuration as the common electrode. Also, the ground electrode, when grounded by a ground conductor, may be cut into two or more. In brief, when the capacitor network is mounted onto the circuit substrate, the data electrode, common electrode and ground electrode need only constitute electrostatic capacity.

Although several embodiments have been described, they are merely exemplary of the invention and not to be construed as limiting, the invention being defined solely by the appended claims.

We claim:

1. A capacitor network for eliminating noise contained in a plurality of data signals, comprising:
    a dielectric substrate;
    a plurality of data signal transmission means for transmitting data signals across said dielectric substrate;
    each said data signal transmission means including a data electrode disposed on one side of said dielectric substrate, a data input terminal member connected to one end of said data electrode, and a data output terminal member connected to an opposite end of said data electrode;
    a common electrode disposed on the other side of said dielectric substrate opposite said plurality of data electrodes, said common electrode having at least one terminal member connecting said common electrode to ground;
    each said data input terminal member, each said data output terminal member, and said at least one terminal member connecting said common electrode to ground including an elongated conducting member having one end connected to its respective electrode and an opposite end adapted to be connected to a connecting point on a circuit substrate.

2. The capacitor network as set forth in claim 1, wherein:
    said dielectric substrate comprises a ceramic material.

3. The capacitor network as set forth in claim 1, wherein:
    said dielectric substrate is entirely molded with resin except for the open sides of said terminals.

4. The capacitor network as set forth in claim 1, wherein:
    each of said terminal members further includes a clip for clipping said terminal member to said dielectric substrate and to said respective electrode.

5. The capacitor network as set forth in claim 1, wherein:
    each of said terminal members is a pressure welding type terminal member.

6. The capacitor network as set forth in claim 1, wherein:
    said common electrode is a first common electrode;
    and a second common electrode is between said first common electrode and said second common electrode, said second common electrode being connected to ground.

7. The capacitor network as set forth in claim 6, and further including:
    a circuit substrate, said second common electrode provided on said circuit substrate.

8. The capacitor network as set forth in claim 7, wherein:
    each said terminal member has a bent portion bent in the direction of said circuit substrate.

9. The capacitor network as set forth in claim 8, wherein:
    each said terminal member has a portion extending from said bent portion parallel to said circuit substrate and contacting an area of said circuit substrate.

10. The capacitor network is set forth in claim 1, wherein:
    each said terminal member is soldered to its respective electrode.

* * * * *